US012668419B2

(12) United States Patent
Petrin et al.

(10) Patent No.: US 12,668,419 B2
(45) Date of Patent: Jun. 30, 2026

(54) FULLY ASSEMBLED, FOLDABLE DEVICE TO WHICH A PERFORATED BAG IS ATTACHED TO ALLOW FOR THE HORIZONTAL (PARALLEL TO THE GROUND) BAGGING OF LEAVES, GRASS TRIMMINGS, AND OTHER GARDEN AND LAWN DEBRIS, ESPECIALLY VIA POWERED LEAF BLOWER

(71) Applicants: Timothy James Petrin, Forked River, NJ (US); Robert Alan Bard, Barnegat, NJ (US); Douglas Aaron Bard, Brielle, NJ (US)

(72) Inventors: Timothy James Petrin, Forked River, NJ (US); Robert Alan Bard, Barnegat, NJ (US); Douglas Aaron Bard, Brielle, NJ (US)

( * ) Notice: Subject to any disclaimer, the term of this patent is extended or adjusted under 35 U.S.C. 154(b) by 0 days.

(21) Appl. No.: 18/819,020

(22) Filed: Aug. 29, 2024

(65) Prior Publication Data

US 2025/0072341 A1 Mar. 6, 2025

Related U.S. Application Data

(60) Provisional application No. 63/628,900, filed on Aug. 30, 2023.

(51) Int. Cl.
B65F 1/14 (2006.01)
A01G 20/43 (2018.01)

(52) U.S. Cl.
CPC ............ B65F 1/1415 (2013.01); A01G 20/43 (2018.02); B65F 2240/138 (2013.01)

(58) Field of Classification Search
CPC ... B65F 1/1415; B65F 2240/138; A01G 20/43
(Continued)

(56) References Cited

U.S. PATENT DOCUMENTS 761,962 A * 6/1904 Hill ......................... A45C 13/04
150/121
860,183 A * 7/1907 Barr ................... B65D 88/1618
383/34.1
(Continued)

FOREIGN PATENT DOCUMENTS

CA 2545302 A1 * 10/2007 ........... B65D 33/007
DE 202013004873 U1 * 7/2013 ............. A01G 20/43
(Continued)

*Primary Examiner* — Taylor Morris

(57) ABSTRACT

Large, pliable/flexible bags are widely used for collecting and discarding garden and lawn debris. Unfortunately, these bags alone make it very difficult for a single worker to both hold open the bag and deposit debris into the bag at the same time. Attempts have been made to provide frames for supporting an open bag to help a single user rake leaves and debris into a bag by him/herself; none have ever been created to blow leaves and other debris directly into a bag with a powered leaf blower—the device in this patent application is designed to do just that. Very significantly, the present invention is a foldable/collapsible self-contained fully assembled frame (hereinafter "the frame") for the attachment of a perforated bag thereby requiring no additional add-on or separate frame parts to both fully function and to fold up for convenient storage, packaging, and transportability.

1 Claim, 9 Drawing Sheets

(58) Field of Classification Search
USPC ........................................................ 248/95
See application file for complete search history.

(56) References Cited

U.S. PATENT DOCUMENTS

| | | | | |
|---|---|---|---|---|
| 1,049,821 | A * | 1/1913 | Devini .................. | B65F 1/1415 141/340 |
| 2,731,184 | A * | 1/1956 | Thurber, Jr. ............ | B65B 67/12 141/390 |
| 2,903,033 | A * | 9/1959 | Robinson ............... | A45C 13/06 190/122 |
| 3,653,619 | A * | 4/1972 | Plum .................. | B65B 67/1205 312/275 |
| 3,711,141 | A * | 1/1973 | Soergel .................. | A47L 13/52 294/1.4 |
| 3,722,023 | A * | 3/1973 | Gray ........................ | B65D 7/28 15/257.1 |
| 4,196,880 | A * | 4/1980 | Hynes .................... | B65B 67/12 312/4 |
| 4,299,365 | A * | 11/1981 | Battle ................. | B65B 67/1238 280/845 |
| 4,358,083 | A * | 11/1982 | Haubrich ............... | B65B 67/12 248/156 |
| 4,440,430 | A * | 4/1984 | Kruse ................. | B65B 67/1238 15/257.1 |
| 4,457,549 | A * | 7/1984 | Lowery .............. | B65B 67/1238 294/1.4 |
| 4,815,866 | A * | 3/1989 | Martone ............ | B65B 67/1238 141/390 |
| 5,106,041 | A * | 4/1992 | Jelincic .................. | B65B 67/12 141/390 |
| 5,222,536 | A * | 6/1993 | Hodgdon ............ | B65B 67/1205 53/381.1 |
| 5,316,060 | A * | 5/1994 | Hodgdon ............ | B65B 67/1205 53/381.1 |
| 5,738,315 | A * | 4/1998 | Kent, Jr. ............... | B65F 1/1415 248/156 |
| 6,030,010 | A * | 2/2000 | Graeff ................. | B65B 67/1255 383/33 |
| 6,149,303 | A * | 11/2000 | Froehlich ............... | A01G 20/40 383/33 |
| 8,959,704 | B1 * | 2/2015 | Pena ..................... | B65F 1/1415 15/257.3 |
| 9,033,291 | B2 * | 5/2015 | Branham ............ | B65B 67/1211 248/101 |
| 11,240,963 | B2 * | 2/2022 | Evans ................... | B65F 1/0006 |
| 2004/0195467 | A1 * | 10/2004 | Passage ............. | B65B 67/1255 248/95 |
| 2005/0077438 | A1 * | 4/2005 | Mutert ................. | B65F 1/1607 248/166 |
| 2007/0089803 | A1 * | 4/2007 | Wallek ................... | B65F 1/141 141/337 |
| 2011/0272371 | A1 * | 11/2011 | Pettifer .................... | B60R 7/02 211/85.15 |
| 2011/0284703 | A1 * | 11/2011 | Auguste ............... | B65F 1/1415 248/95 |
| 2014/0252002 | A1 * | 9/2014 | Donoghue ............... | B65F 1/00 220/495.01 |
| 2021/0371197 | A1 * | 12/2021 | Sokyrka ............... | B65F 1/1415 |

FOREIGN PATENT DOCUMENTS

| | | | | | |
|---|---|---|---|---|---|
| KR | 20190043893 A | * | 4/2019 | ........... | B65F 1/1415 |
| KR | 20220081840 A | * | 6/2022 | ........... | B65F 1/1415 |

* cited by examiner

19

20

26

FULLY ASSEMBLED, FOLDABLE DEVICE TO WHICH A PERFORATED BAG IS ATTACHED TO ALLOW FOR THE HORIZONTAL (PARALLEL TO THE GROUND) BAGGING OF LEAVES, GRASS TRIMMINGS, AND OTHER GARDEN AND LAWN DEBRIS, ESPECIALLY VIA POWERED LEAF BLOWER

DESCRIPTION OF THE PRIOR ART

The present invention claims priority from the U.S. provisional patent application Ser. No. 63/628,900 filed on Aug. 30, 2023 entitled "A Foldable Device To Which A Bag Is Attached To Allow For The Horizontal (Parallel To The Ground) Bagging Of Leaves, Grass Trimmings, And Other Garden And Lawn Debris Whereby For The Device To Be Fully Operational The One And Only Part That Has To Be Separately Attached To The Device Is The Bag."

Large, pliable, and flexible bags are widely used for collecting and discarding leaves, grass trimmings and other garden and lawn debris. Unfortunately, these bags alone make it difficult for a single worker to both hold the mouth of the bag open and at the same time deposit leaves and other debris into the bag. Attempts have been made to provide frames for supporting a bag with the mouth open in both the vertical and horizontal positions, specifically to help a single user rake leaves and debris into a bag by him/herself-however, none have been created to help the aforementioned single user to blow debris into a bag with a powered leaf blower, which the device described in this patent application is designed to do.

The Following Patents are Hereby Referenced as being Typical of Known Prior Art:

- U.S. Pat. No. 5,011,103A—Inventors: Franklin A. Hayes & Harold E. Sexton; Filed on Apr. 5, 1990; Issued on Apr. 30, 1990—Expired-Lifetime
- U.S. Pat. No. 7,284,732B1—Inventor: Vito Lopa; Filed on Sep. 21, 2005; Issued on Oct. 10, 2007—Expired-Fee Related
- U.S. Pat. No. 7,237,753B2—Inventor Donna Metcalfe; Filed on Nov. 9, 2004; Issued on Jul. 3, 2007—Expired-Fee Related.
- U.S. Pat. No. 8,047,477B2—Inventor Thomas F. Wilkinson; Filed on Feb. 9, 2009; Issued on Aug. 12, 2010—Expired-Fee Related
- U.S. Patent Publication No. US20100237203A1—Inventor: Melanie Romero; Filed on May 26, 2010; Published on Sep. 23, 2010—Abandoned
- U.S. Patent Publication No. US20060032992A1 (the '992 publication)—Inventor: Ivlaw Rosheuvel on Aug. 16, 2005; Published on Feb. 16, 2006—Abandoned
- U.S. Pat. No. 4,759,519—Inventor: Wen H. Cheng
- U.S. Pat. No. 4,749,011—Inventor: Nicholas M. Rylander
- U.S. Pat. No. 4,664,348—Inventors: Otho O. Corsaut, III, et al
- U.S. Pat. No. 3,744,081—Inventor: Ann Miller
- U.S. Pat. No. 4,832,292—Inventor: William T. Beckman
- U.S. Pat. No. 4,768,742—Inventor: Edward P. Kaaloa
- U.S. Pat. No. 4,006,928—Inventor: Louis E. Beugin Hayes and Sexton present a frame-bag combination device that requires assembly by the user not only of the bag to the frame but also of the frame itself. The main idea is to provide for a combination bag and frame together for the purpose of raking only. The device is not stable for or capable of blowing, does not provide a clamping system to firmly secure a reusable or disposable bag to the frame, and is not self-contained so that assembly of the frame would be required by the user. The other references are illustrative of different approaches. They are distinguishable by either not collapsing, collapsing with difficulty, presenting impediments to depositing debris into the bag, not being secure from toppling over or from unwanted movement through use, and not providing any means for securing the bag, especially disposable bags.

The present invention provides another and different approach that works very well, and is the only one designed to be self-contained (not requiring assembly of the frame, and only requiring the attaching and detaching disposable or reusable bags) and works for blowing leaves and other debris with force into both reusable and disposable bags that are secured through a clamping mechanism built into the frame thus allowing for the easy placement and removal of the bag. It is the intention of the present invention to provide a frame that constitutes an improvement over the prior art in terms of being fully assembled, self-contained, foldable for easy use, storage, packaging, and transport. The frame also provides an easy-to-use bag clamping system strong enough for blowing, separate from raking, debris directly into the collection bag obviating the need for a multi-step cleanup process.

BACKGROUND OF INVENTION

Leaf blowers are a very common leaf and debris cleanup tool. However, leaf cleanup with a blower is a multi-step process, and/or a multi-person undertaking, of blowing the leaves into piles and then picking them up to bag them. This invention relates to leaf and debris collection predominantly utilizing a blower, specifically into a fully assembled, foldable frame that facilitates the direct collection of leaves and debris blown directly into disposable and/or reusable bags that are easily attached and secured to the frame, and then detached by a single worker via an incorporated clamping system.

SUMMARY OF INVENTION

A foldable/collapsible, self-contained fully assembled frame for the attachment of a bag (all references in this application to a bag for this invention shall mean a bag that is perforated and disposable and/or reusable) thereby requiring no additional add-on or separate frame parts to fully function such that all hinged struts of the frame are designed to be folded up parallel to each other for convenient storage, packaging, and transportability. The frame secures, via clamping, a bag around the entire periphery of the frame such that a portion of the bag rests horizontally on the ground and the remainder of the bag is attached so as to present a large straight-sided opening to facilitate the collection of leaves, grass trimmings, and other garden and lawn debris that is specifically blown forcefully by a leaf blower, or even raked or pushed in via a rake or broom. An important and novel component of the device is the use of hinges with incorporated locking pins so that the frame is both foldable/collapsible from the opened position, and stable/rigid in the opened position.

DETAILED DESCRIPTION OF INVENTION

Figure 1:
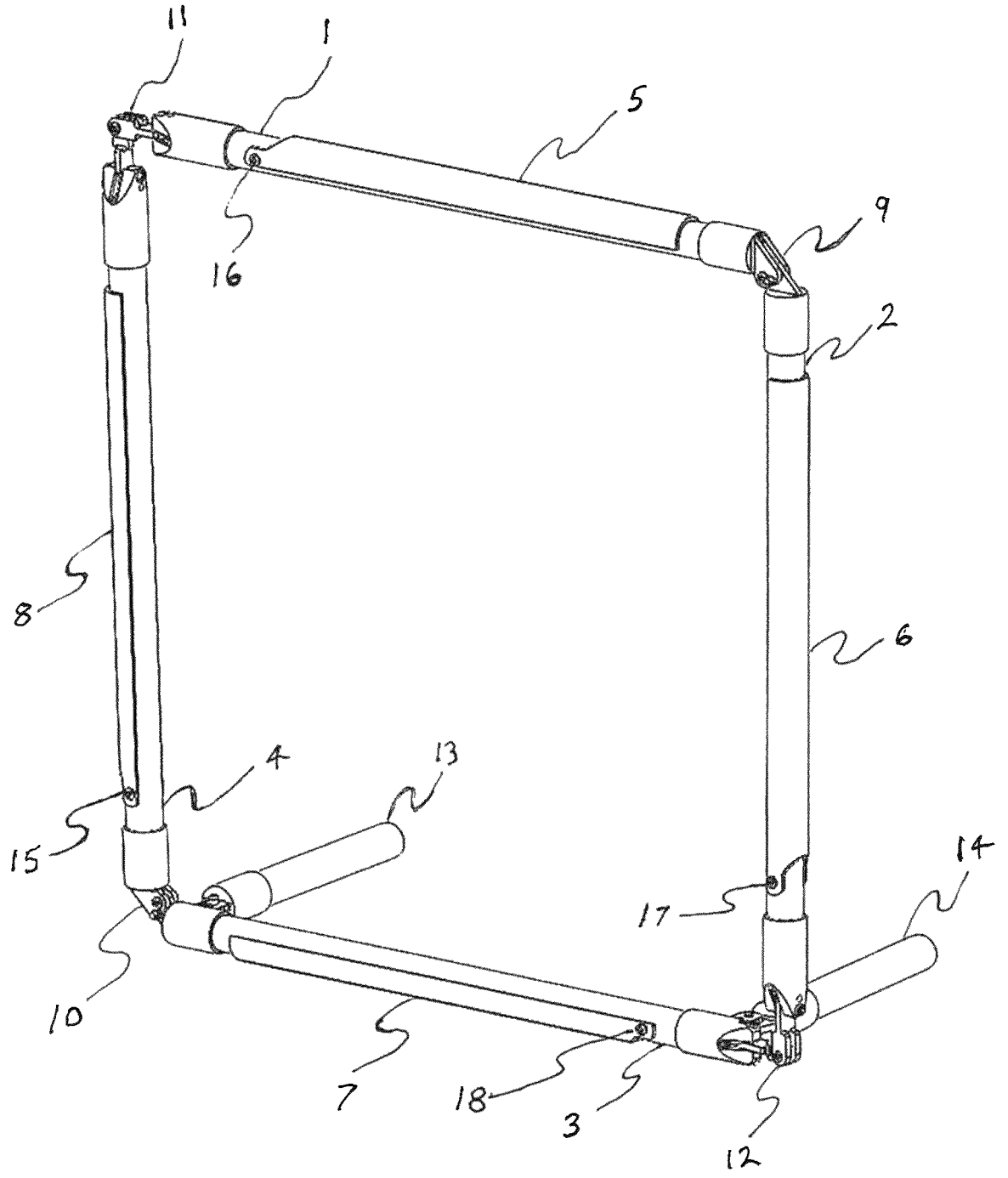
FIG. 1 is a view of the frame locked in the fully opened position with the incorporated bag clamps in the locked position.
Figure 2:
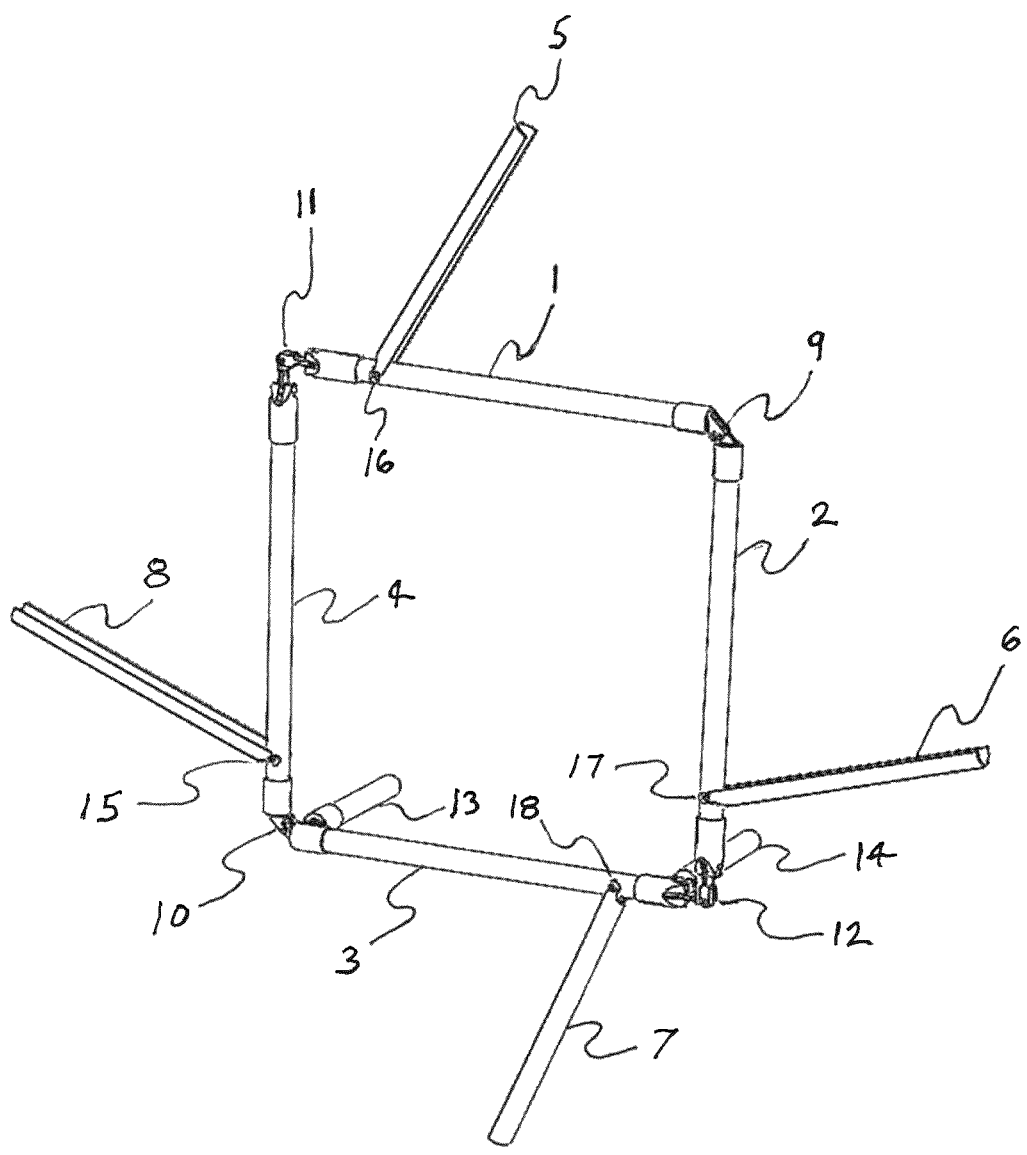
FIG. 2 is a view of the frame locked in the fully opened position with the incorporated bag clamps in the unlocked open position.
Figure 5:
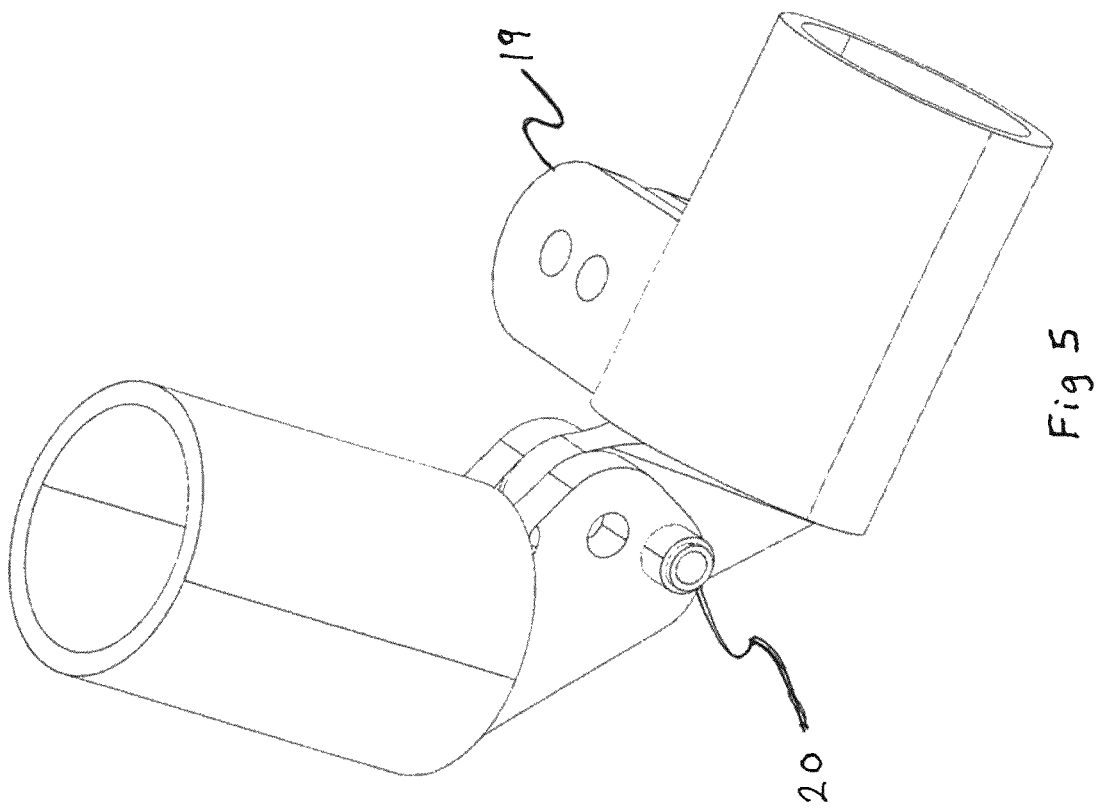
FIG. 5 is a close-up view of the integral component having a single hinged joint to connect and hinge in one (1) plane two (2) adjacent struts of the frame that form the rectangular or square opening and having the female mating section to connect and hinge perpendicularly one of the smaller struts used to keep the frame vertical.
Figure 8:
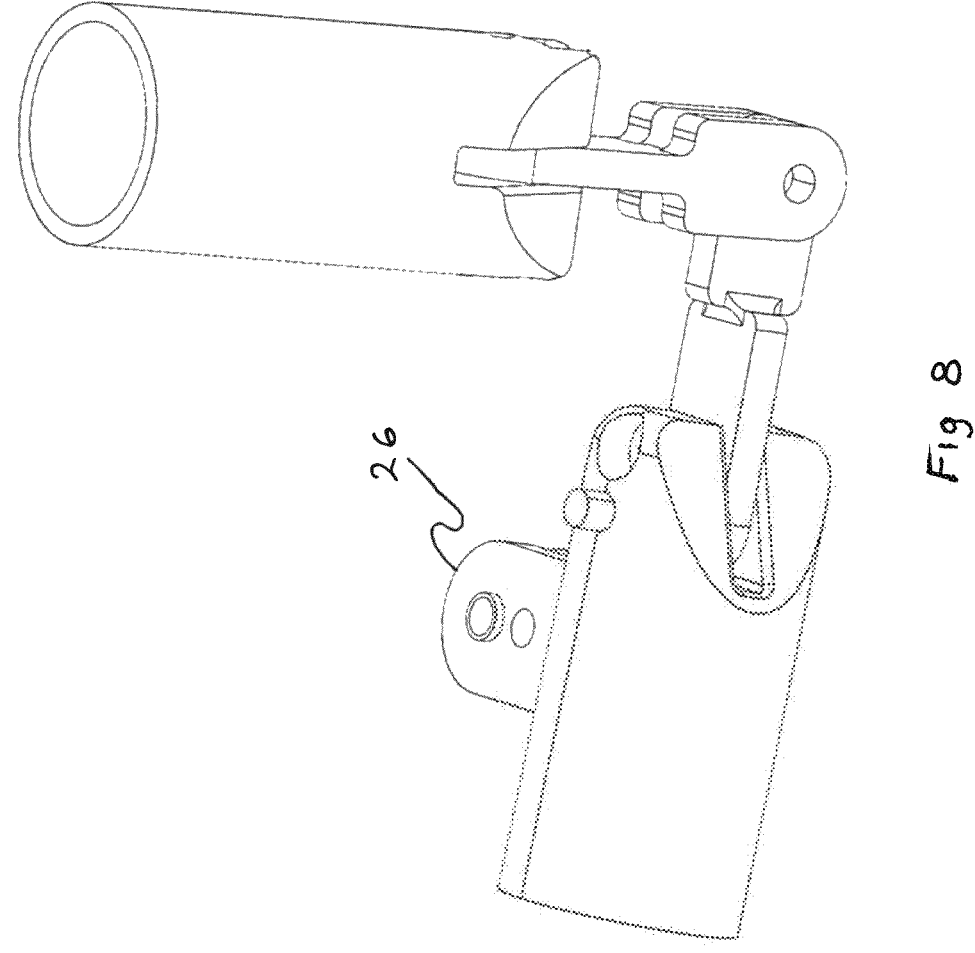
FIG. 8 is a close-up view of the integral component similar to the one shown in FIG. 6 but in less detail and showing the female mating section for the hinge of the smaller ground support strut.

The present invention is a foldable/collapsible, self-contained fully assembled frame (hereinafter "the frame") for the attachment of a bag (disposable and/or reusable) thereby requiring no additional add-on or separate frame parts to fully function such that all hinged struts of the frame are designed to be folded up parallel to each other for convenient storage, packaging, and transportability. FIG. 1 is an illustration of the entire frame locked in the fully opened position with the incorporated bag clamps in the locked position. The frame comprises of four (4) main struts to make a rectangle or square: strut 1 is positioned parallel to the ground and acts as the top crossbar to the device; struts 2 and 4 are positioned perpendicular to the ground and to struts land 3, and act as the side posts; strut 3 lies along the ground and acts as part of the base of the device, with struts 13 and 14, so that the device remains upright during use. Each strut 1,2,3 and 4 has a bag clamp 5,6,7, and 8 incorporated into it using a screw 15, 16, 17, and 18 (respectively) that allows for the clamps to stay connected to the frame and easily pop open to allow the bag to be attached or detached to/from the frame and snap closed to secure the bag to the frame and/or the clamps to the frame when not in use. FIG. 2 illustrates these clamps 5,6,7, and 8 unlocked and in the open position on the fully opened and locked frame. The frame also comprises of two (2) smaller struts 13 and 14 that attach to the bottom strut 3 (via integral components 10, which connects 13, and 12, which connects 14) and lie on the ground forming the base of the device so that it remains upright and stationary during use. These smaller struts 13 and 14 fold into the frame via simple hinges incorporated into integral components 10 and 12; as seen in FIGS. 5 and 8, integral components 10 and 12 contain the female mating section 19 and 26 of the hinge for the small support struts 13 and 14. These smaller struts may also include spikes (not shown in any drawings), hinged or otherwise rotationally connected to these struts, that can be inserted into the ground to prevent movement of the device while debris is blown or otherwise deposited into the attached bag.

The four struts 1,2,3, and 4 are connected together by integral components 9,10,11, and 12. Integral components 9 and 10 are single joints located catty-corner to one another. Integral components 11 and 12 are compound/double joints located catty-corner to one another. The location and nature of these joints is what allows for the frame to be fully collapsible and to remain fully assembled together at the same time.

Figure 3:
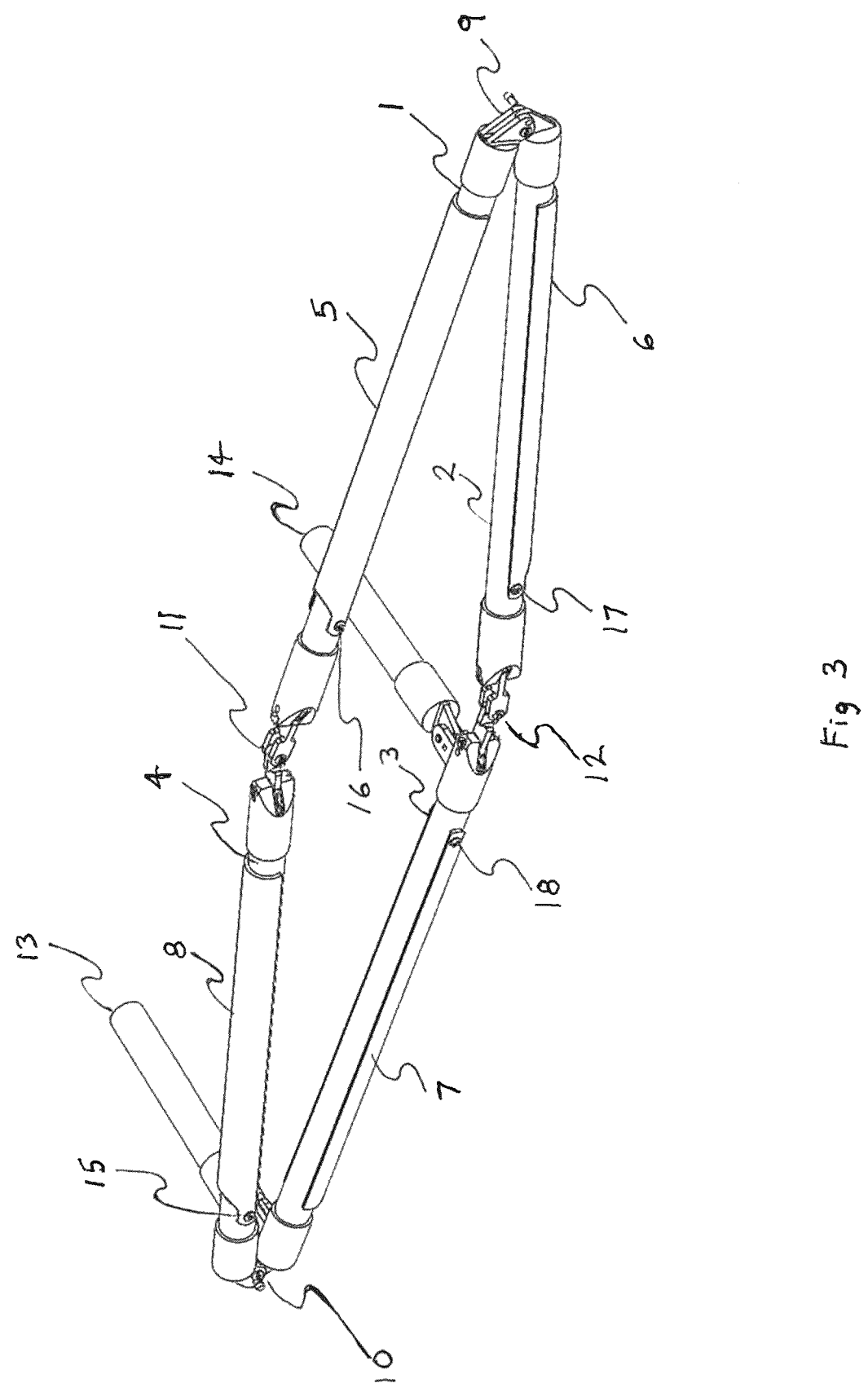
FIG. 3 is a view of the frame partially folded with the incorporated bag clamps in the locked position.

From the fully opened, locked position, the device can be folded down for ease of storage, packaging, and transportation. Once the locking pin has been disengaged, the frame can commence collapsing as seen in FIG. 3, which shows the frame partially collapsed. The compound/double joint will then permit the device to fold again as seen in FIG. 4 such that strut 1 will be on top of strut 2 and folded next to strut 4 which will be on top of strut 3.

FIG. 5 is an illustration showing a close-up of 10, the integral component having a single hinged joint to connect and hinge, using the pivoting socket head bolt 20, in one (1) plane two (2) adjacent struts of the frame that form the rectangular or square opening and having the female mating section 19 to connect and hinge perpendicularly smaller strut 13, which is used to keep the frame vertical on the ground.

Figure 6:
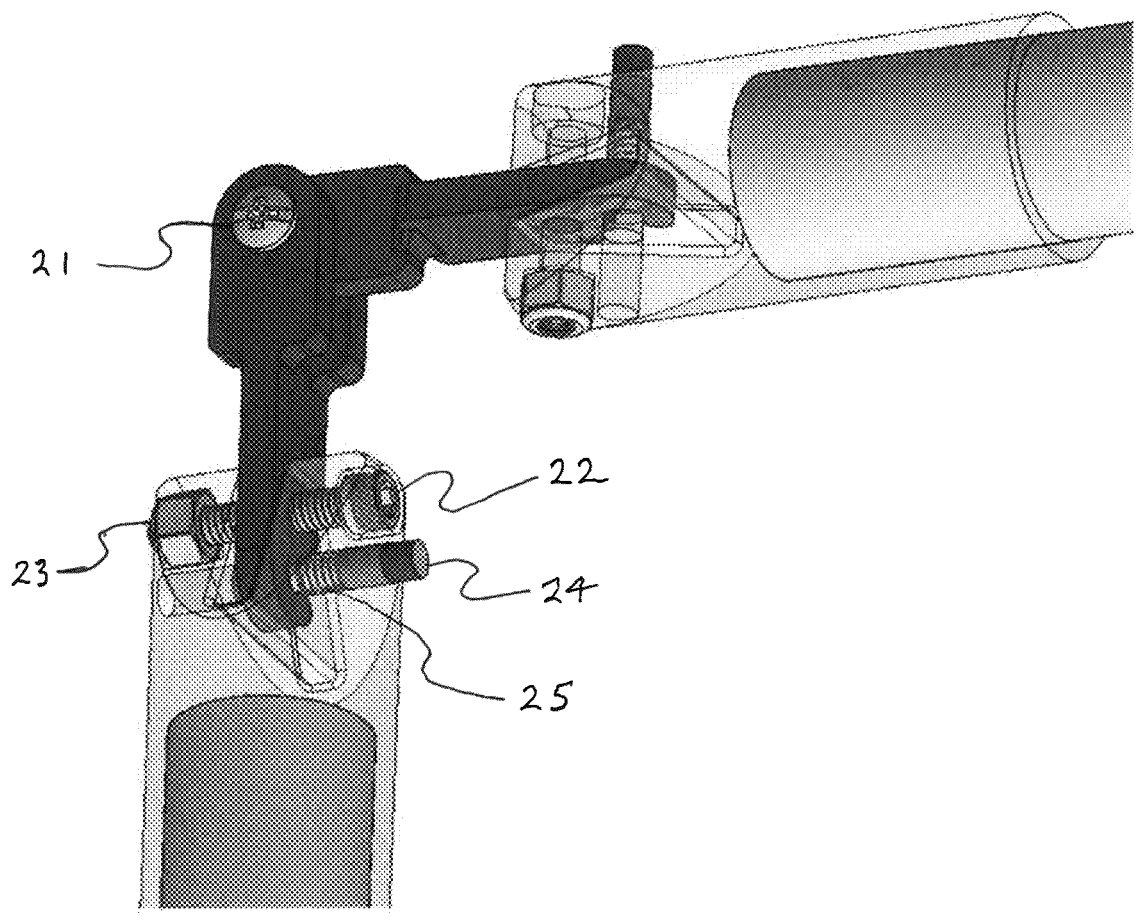
FIG. 6 is a close-up view, when the frame is locked in the fully opened position, of the integral component having a compound/double hinged joint to connect and hinge in two (2) planes two (2) adjacent struts of the frame.

FIG. 6 is an illustration showing a close-up of 11 the integral component having a compound/double hinged joint to connect and hinge in two (2) planes two (2) adjacent struts of the frame with 21 pivoting screw, 22 the pivoting socket head bolt, 23 the mating hex nut for the socket head bolt, 24 the locking pin, and 25 the locking pin spring. This joint allows the two (2) adjacent connected struts 1 and 4 to rotate in two (2) planes perpendicular to one another as well as having a locking mechanism to keep the frame in the fully opened position.

Figure 4:
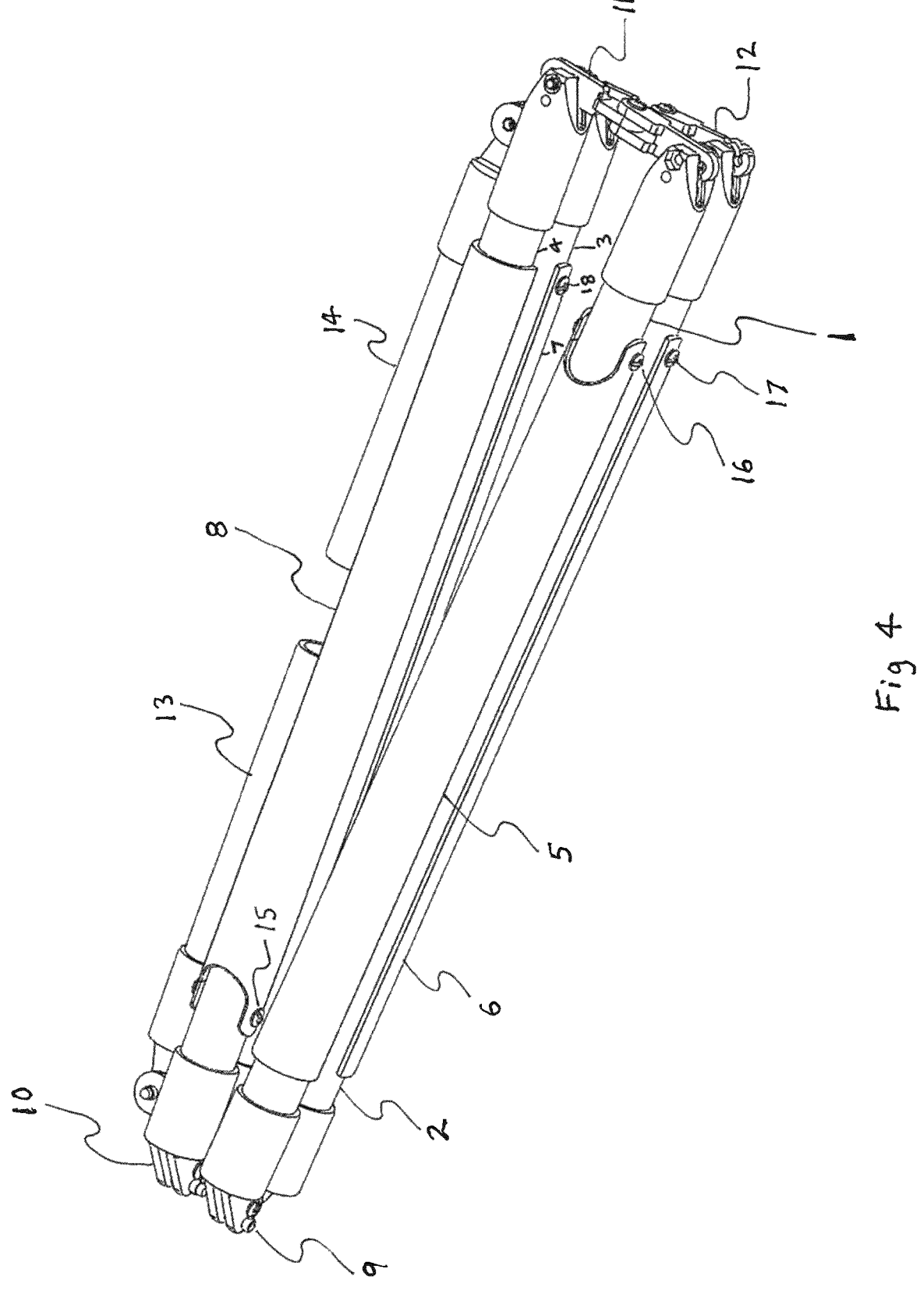
FIG. 4 is a view of the frame fully folded with the incorporated bag clamps in the locked position.
Figure 7:
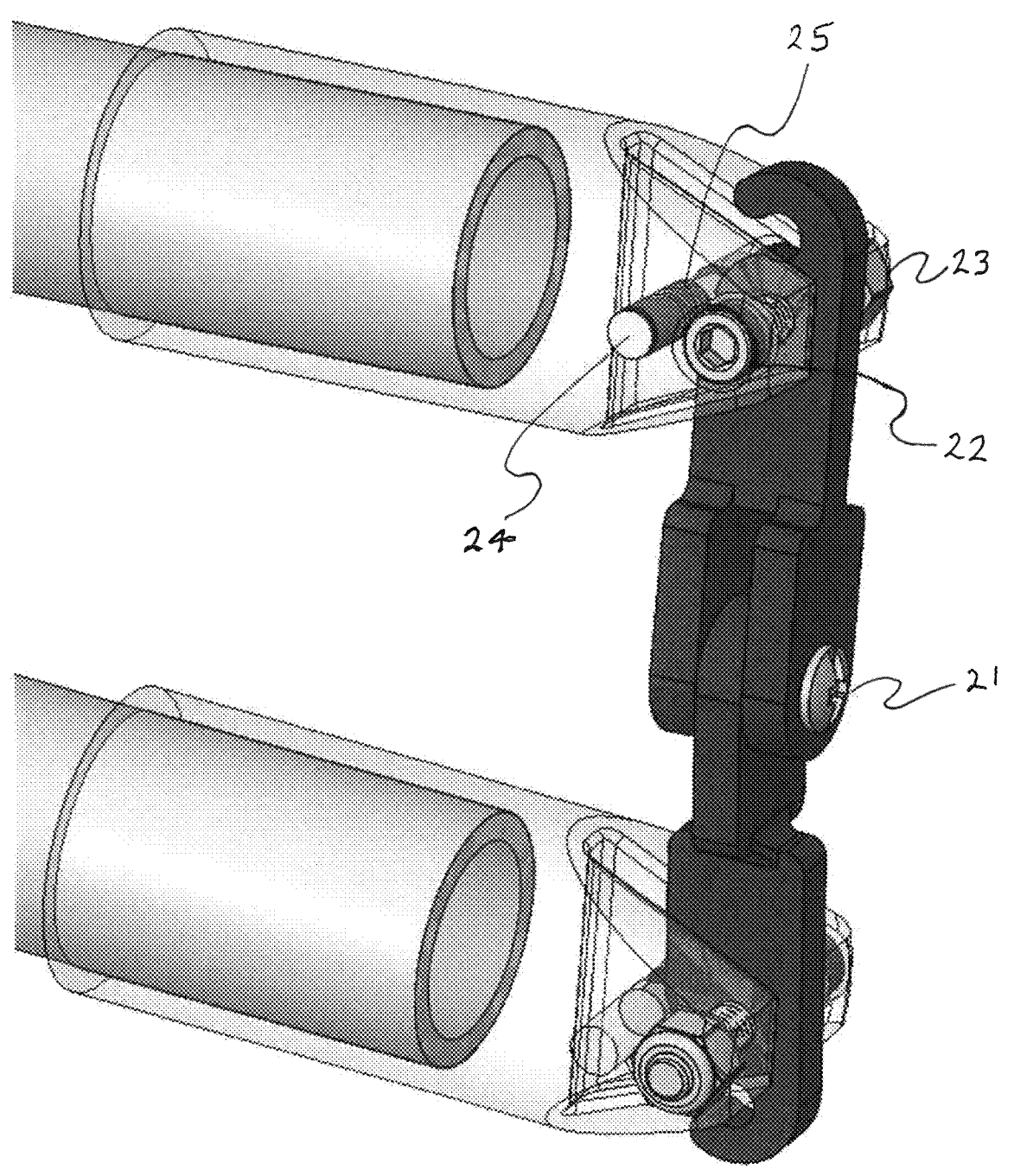
FIG. 7 is a close-up view of the integral component shown in FIG. 6 when the frame is in the fully folded position.

FIG. 7 is an illustration showing a close-up of 11 the integral component as seen in FIG. 4.

FIG. 8 is an illustration showing the integral component 12, similar to the one shown in FIG. 6 but for the catty-corner integral component to 11, shown in less detail, and showing the female mating section 26 for the hinge of the smaller ground support strut 14.

Figure 9:
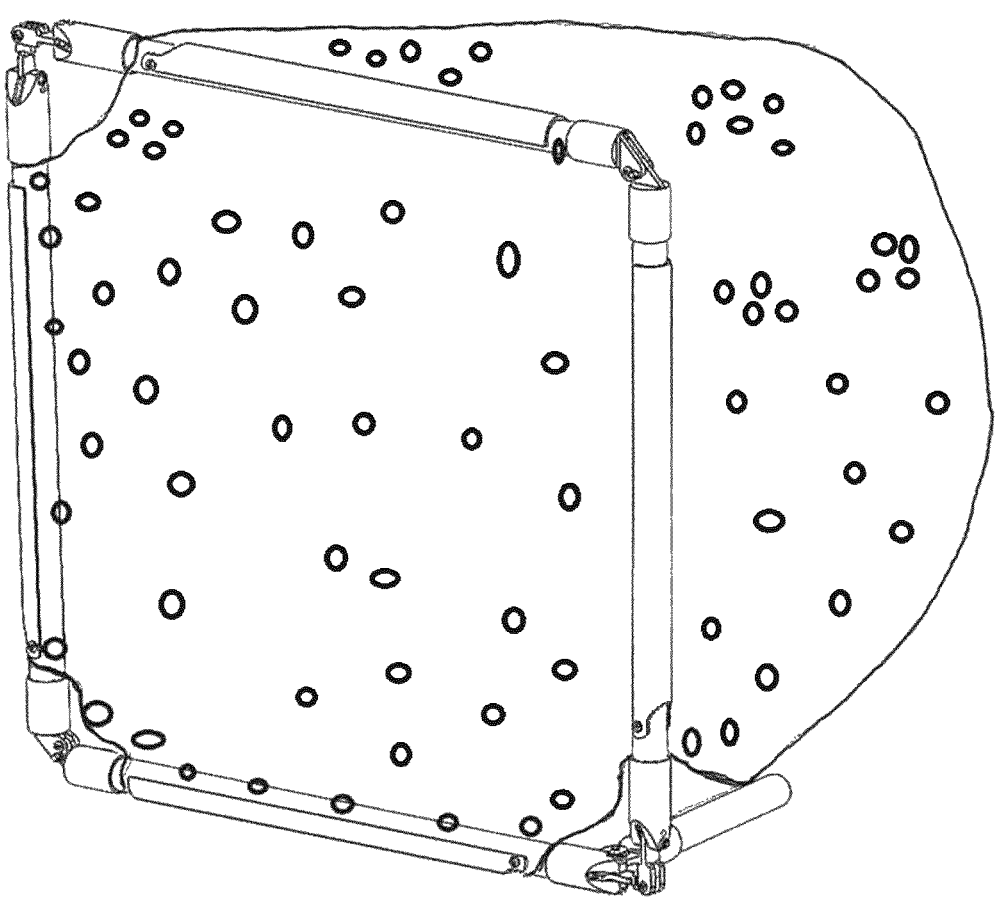
FIG. 9 is a view of the frame showing the perforated bag attached and ready for leaves and other debris to be blown, raked, or otherwise deposited into the perforated bag.

FIG. 9 is an illustration showing the entire frame locked in the fully opened position with the incorporated bag clamps in the locked position and securing a perforated bag that has been passed through the inside of the frame and which is ready for leaves and other debris to be forcibly blown or otherwise deposited into said perforated bag.

What is claimed is:

1. A leaf and trash collection container comprising:

(a) a flexible, perforated collection bag having an open end and a closed end; and (b) a self-supporting, foldable frame for receiving said open end of said flexible, perforated collection bag, said frame comprising;

(i) a rectangular or square enclosed arch lying in a substantially upright vertical plane, said arch formed by four (4) struts hinged together, wherein each of said four struts incorporates a clamping system for securing said flexible, perforated collection bag;

(ii) two (2) first integral components forming first opposing corners of the frame when fully assembled, said first integral components each connecting two adjacent strut ends and serving as single-plane hinges to allow said connected adjacent struts to pivot relative to one another in a single plane;

(iii) two (2) second integral components forming second opposing corners of the frame when fully assembled, said second integral components each connecting two other adjacent strut ends and serving as dual-plane hinges to allow said connected struts to pivot relative to—one another in two perpendicular planes;

(iv) a locking mechanism incorporated into at least one of said first or second integral components, said locking mechanism configured to lock the four struts in a position perpendicular to one another to form the rectangular or square enclosed arch; and (v) a minimum of two (2) smaller support struts, each hinged to one of the integral components forming bottom corners of the frame, wherein said smaller support struts are configured to lie on the ground and are positioned perpendicularly to the strut forming the bottom of the rectangular or square enclosed arch to hold said arch in the substantially upright vertical plane.

* * * * *